May 24, 1960
W. L. CLARK
2,937,555
FLYING SHEAR WITH MEANS FOR ADJUSTING BLADE SETTING
Filed Nov. 25, 1957
2 Sheets-Sheet 1
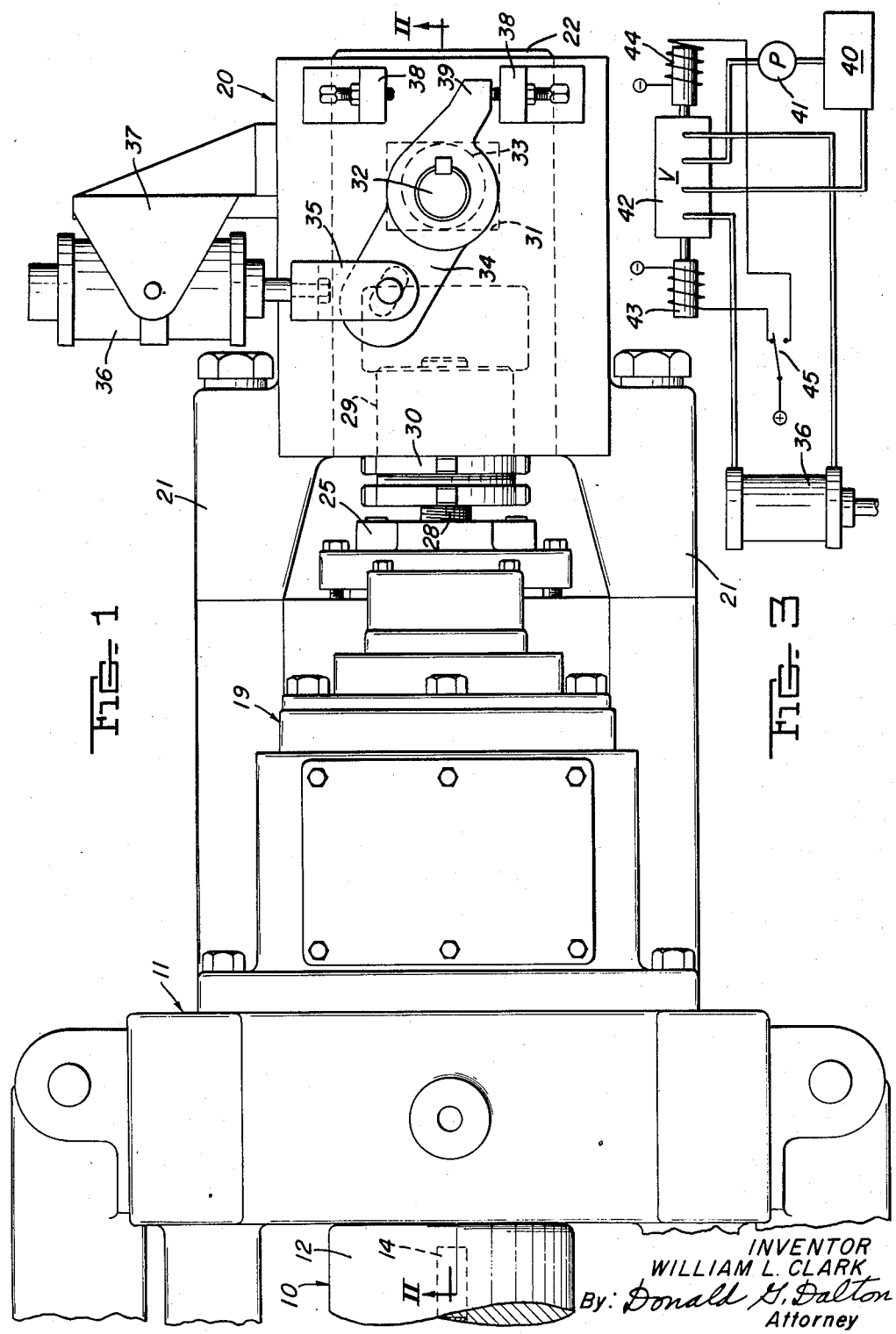
INVENTOR
WILLIAM L. CLARK
By: Donald G. Dalton
Attorney

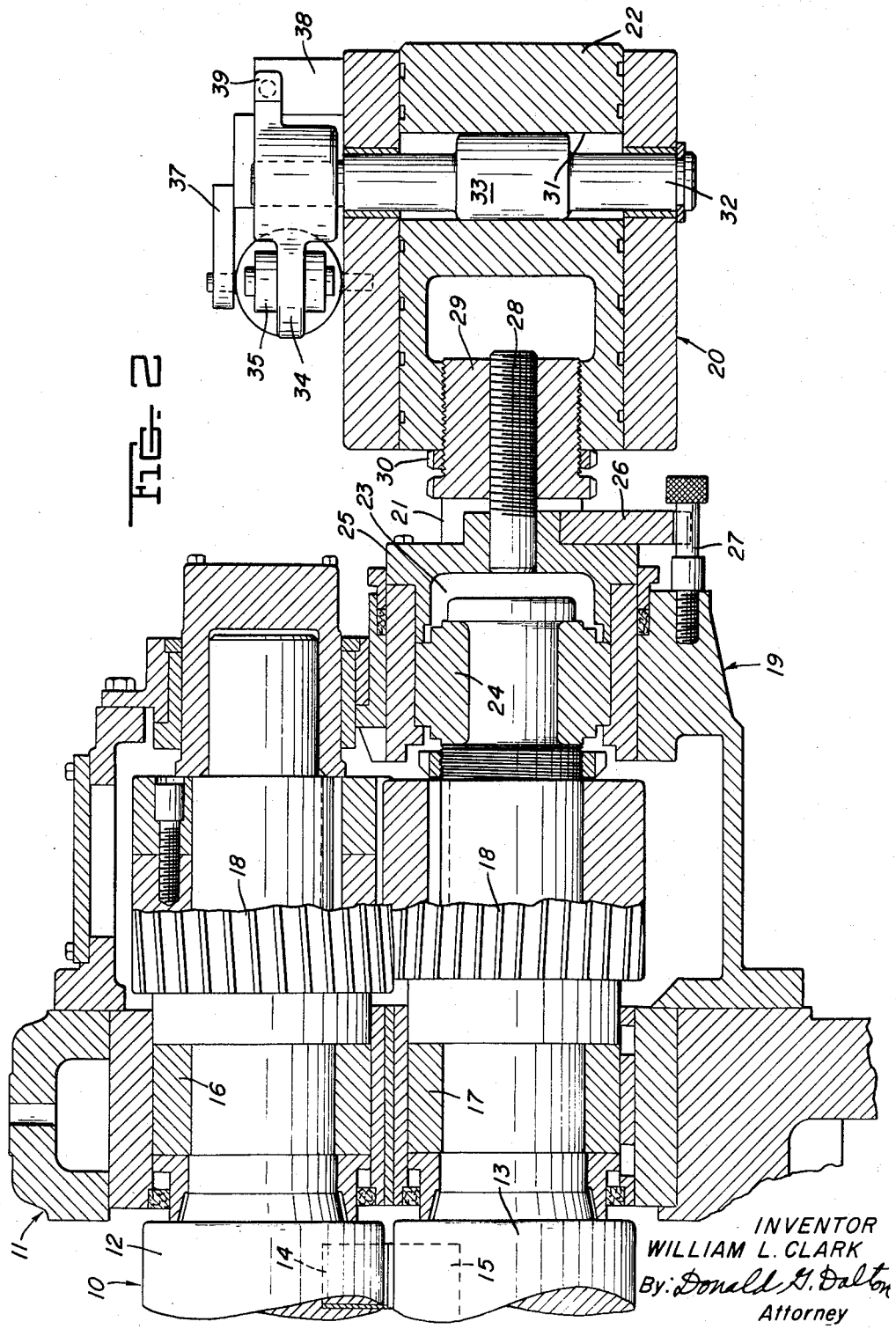

United States Patent Office 2,937,555
Patented May 24, 1960

2,937,555

FLYING SHEAR WITH MEANS FOR ADJUSTING BLADE SETTING

William L. Clark, Concord, Calif., assignor to United States Steel Corporation, a corporation of New Jersey Filed Nov. 25, 1957, Ser. No. 698,802

3 Claims. (Cl. 83—345)

This invention relates to rotary flying shears such as are employed to cut strip into lengths and, in particular, to means for adjusting the setting of the blades of the rotors to insure their proper cooperation regardless of the speed at which they are driven.

In the operation of shears for cutting thin steel strip such as tin-plate into sheets, difficulty is encountered because the setting of the shear blades relative to each other on the rotors respectively, which gives good results at normal speeds, produces poor or ragged cuts or an entire failure to cut when starting up or slowing down. To prevent this, the blades are usually set in closer relation than is suited for cutting at full-speed but this causes abnormal wear.

I have invented means to change the setting of the blades relative to each other, operable while the shear is in motion, whereby a close setting may be obtained when starting or stopping and a more open setting during full-speed operation. In a preferred embodiment, I provide the two rotors of the shear with meshing helical gears of long pitch and mount one rotor for axial movement with its bearings relative to the other. I provide means to effect slight axial shifting of the movable rotor and thus change the angular position of one rotor and its blade relative to the other. I also provide means responsive to the speed of the shear for controlling the rotor-shifting means. In this way, the blade setting is changed automatically from that suitable for low-speed operation to that suitable for normal-speed operation as the shear accelerates and vice versa as it slows down.

A complete understanding of the invention may be obtained from the following detailed description and explanation which refer to the accompanying drawings illustrating the present preferred embodiment. In the drawings:

Figure 1 is a plan view of one end of a rotary shear having the invention incorporated therein;

Figure 2 is a partial vertical section through the shear taken along the plane of line II—II of Figure 1; and Figure 3 is an electrical circuit diagram of a control system.

Referring now in detail to the drawings, and for the present, to Figures 1 and 2 particularly, a shear 10 includes spaced housings 11 (only one of which is shown) having superposed rotors 12 and 13 journaled therein, the rotors being provided with blades 14 and 15 which coact to effect a shearing stroke on a strip passing between the rotors, on each rotation of the latter. Rotor 12 has reduced ends journaled in bearings 16 rigidly secured in the housings 11. Rotor 13 is similarly journaled in bearings 17 but the latter are slidable axially in the housings. Meshing gears 18 are fixed on one of the reduced ends of rotors 12 and 13 respectively, whereby, when one rotor is driven by any suitable means (not shown), the other rotates in unison therewith. Gears 18 are helically cut with a long pitch so that a limited axial movement of one rotor relative to the other causes a slight change in the relative angular positions thereof.

A gear case 19 enclosing gears 18 is mounted on the adjacent housing 11.

The means for adjusting the lower rotor 13 axially relative to the upper rotor 12 includes a guide box 20 mounted outwardly of the end of the rotor on legs 21 secured to housing 11. The box has an opening axially therethrough of square cross-section. A slide block 22 of square cross-section is movable in the box along the axis of rotor 13. A swivel 23 on the end of rotor 13 includes thrust bearing 24 and a cup 25 in which the bearing is secured. The cup is held against rotation by a yoke 26 thereon having a slot fitting slidably on a stud 27 threaded into the end of gear case 19.

A threaded stud 28 extends axially from the end wall of cup 25. A bushing 29 is screwed onto stud 28. The bushing is threaded exteriorly and is screwed into a tapped axial bore in the inner end of block 22. The inner end of the bushing is shaped to take a spanner and a locknut 30 similarly shaped is turned thereon. The pitch of the thread on the interior of the bushing differs from that of the thread on the exterior so that rotation of the bushing effects a fine axial adjustment between cup 25 and block 22, corresponding to the differential between the threads.

Block 22 has a transverse bore 31 adjacent its outer end. A shaft 32 journaled in bearings in the box 20 extends through the bore 31 and has an eccentric or cam 33 thereon fitting snugly in the bore. The upper end of shaft 32 has a crank arm 34 thereon pivoted to a clevis 35 carried by the piston rod of fluid-pressure cylinder 36. This cylinder is trunnioned on a bracket 37 secured to one side of box 20. The admission of power fluid alternately to opposite ends of the cylinder causes crank 34 to rotate back and forth through a limited angle. The angle is determined by adjustable stops 38 on top of box 20 and a finger 39 projecting from the crank and cooperating with the stops. The resulting rotation of shaft 32 and cam 33 reciprocates block 22 as a cam follower through a small distance axially of rotor 13 and, through swivel 23, causes a corresponding shifting of the latter. Movement of the swivel shifts rotor 13 and its bearings axially in housings 11. This shifting, as previously explained, causes an angular adjustment of rotor 13 relative to rotor 12, the extent of which is determined by the pitch of helical gears 18 and the axial movement of rotor 13. It will be evident that the mechanism described may be operated while the rotors 12 and 13 are turning, to vary the clearance between blades 14 and 15 as they execute successive cutting strokes.

In order to achieve automatic control of the adjusting means described above, I utilize the system illustrated in Figure 3. As there shown, cylinder 36 is supplied with fluid under pressure from a reservoir 40 by a pump 41, through a four-way solenoid valve 42. The valve is actuated between two extreme positions by solenoids 43 and 44, for alternately supplying fluid to opposite ends of cylinder 36. The solenoids are controlled by a speed-responsive device 45 such as a centrifugal switch driven at a speed proportional to that of the shear rotors. This device is designed to maintain the energizing circuit of solenoid 43 closed at all times when the speed of the shear is below a predetermined value. Connections between the valve 42 and cylinder 36 are made so that, when solenoid 43 is energized, block 22 is actuated to establish minimum clearance between blades 14 and 15.

When the shear rotors are accelerated to normal speed, device 45 operates to open the circuit of solenoid 43 and close that of solenoid 44. Valve 42 thereupon causes reverse operation of cylinder 36 and movement of block 22 to the position corresponding to maximum clearance between blades 14 and 15. This adjustment is maintained until the shear speed is reduced below that at which device 45 operates, whereupon the initial condition of minimum clearance between the blades is restored.

The invention is characterized by several important advantages. It reduces cobbles and line stops caused by a failure to make a clean cut when operating at low speeds and this increases production. It also eliminates ragged cuts and excessive burrs at low shear speeds. Blade life is increased and the frequency of grinding is reduced by adjusting the blade setting to a clearance appropriate for the speed at which the shear is driven. Conventional manual adjustment of the blades is not interfered with.

Although I have disclosed herein the preferred embodiment of my invention, I intend to cover as well any change or modification therein which may be made without departing from the spirit and scope of the invention.

I claim:

1. In a flying shear including spaced rotors each carrying one of two cooperating blades, the combination therewith of meshing helical gears on said rotors, respectively, power means for shifting one of said rotors axially relative to the other, thereby changing the clearance between the blades, a swivel mounted on one of said rotors, cam means actuated by said power means and a cam follower secured to said swivel.

2. Apparatus as defined in claim 1, characterized by manual adjusting means between said cam follower and said swivel.

3. Apparatus as defined in claim 1, characterized by a threaded connection between said cam follower and swivel.

References Cited in the file of this patent

UNITED STATES PATENTS

| | | |
|---|---|---|
| 353,555 | Goss | Nov. 30, 1886 |
| 966,408 | Hollingsworth | Aug. 2, 1910 |
| 1,421,969 | Loeb | July 4, 1922 |
| 2,002,584 | Rawson | May 28, 1935 |
| 2,121,104 | Shields | June 21, 1938 |
| 2,256,801 | Barber | Sept. 23, 1941 |
| 2,260,402 | Potdevin | Oct. 28, 1941 |